United States Patent [19]

Schwartz

[11] Patent Number: 4,593,980

[45] Date of Patent: Jun. 10, 1986

[54] MICROSCOPE ASSEMBLY FOR MAGNETIC SPECIMENS

[75] Inventor: Abraham Schwartz, Durham, N.C.

[73] Assignee: Magnetic Activated Particle Sorting, Inc., Carrboro, N.C.

[21] Appl. No.: 703,709

[22] Filed: Feb. 21, 1985

[51] Int. Cl.⁴ .................. G02B 21/26; G02B 21/30
[52] U.S. Cl. .................................. 350/529; 350/533
[58] Field of Search ............. 350/533, 529, 536, 362, 350/375; 324/214; 356/244, 246

[56] References Cited

U.S. PATENT DOCUMENTS

| | | | |
|---|---|---|---|
| 1,426,384 | 8/1922 | Hoke | 324/216 |
| 1,835,612 | 12/1931 | Pearson | 324/214 |
| 2,530,564 | 11/1950 | Blaney | 324/214 |
| 3,353,097 | 11/1967 | Johnson | 324/214 |
| 3,482,898 | 12/1969 | Van Den Bosch | 350/536 |
| 4,064,453 | 12/1977 | Haas et al. | 324/214 |

OTHER PUBLICATIONS

J. P. Watson, "Light Valve, Field Actuated", *RCA TN* No. 868, Jun. 11, 1970, 2 pages.

*Primary Examiner*—Jon W. Henry
*Attorney, Agent, or Firm*—B. B. Olive

[57] ABSTRACT

A method and apparatus are provided enabling a magnetically-responsive substance to be contained in a well formed in a non-magnetic material and viewed through a light microscope while subjected to a magnetic field established either by an electromagnet or permanent magnet source. After the observation, the invention also provides means for preserving the observed specimen on a coverslip used to form the well.

8 Claims, 8 Drawing Figures

MICROSCOPE ASSEMBLY FOR MAGNETIC SPECIMENS

DESCRIPTION

1. Technical Field

The invention relates to methods and apparatus for examining functionally magnetic specimens such as magnetic microspheres. More specifically, the invention relates to method and apparatus for examining with a light microscope and thereafter preserving a magnetically responsive substance of interest.

2. Background Art

Magnetically responsive microspheres or other particles are in widespread use in numerous applications for cell labeling, particle classification and sorting and in disease treatment. A promising application involves use of magnetic microspheres coated with polyclonal or monoclonal antibodies which are specifically targeted against the population of the cell of interest. Separation of magnetically-responsive microspheres and other magnetically-responsive particles has been successfully accomplished with the aid of magnetic fields and suitably prepared reagents. In some applications, the desired results have been facilitated by use of both fluorescent and magnetic properties in the carrier substance.

A need which permeates essentially all applications of functional magnetic specimens, such as the mentioned magnetic microspheres, is the need to examine fluids containing magnetically-responsive microspheres or particles while magnetic separation is taking place. Such visual observations with the eye enable the investigator to observe particle movement and also to observe after separation has been completed the concentration of magnetically-attracted particles of interest.

Scanning and transmission electron microscopes have been employed for examining magnetically-responsive microspheres associated with antibodies after magnetic separation. Also, the separated specimens have been mounted on coverslips for subsequent examination. This type of experiment is described on page 137 of the book "Methods of Cell Separation", Vol. 3, Edited by Nicholas Catsimpoolas, published by Plenum Press. Another practice in the prior art has been to examine fluids containing magnetically-responsive substances while under the influence of a magnetic field and while contained in a transparent test tube, beaker, or the like, in order to visually observe the pattern, quantity and other characteristics of particles separated out under the influence of the field. It has also been suggested in the prior art to place droplets of blood samples with magnetically-responsive substances contained therein on transparent tape for the purpose of facilitating analysis and examination. Various methods and procedures have also been devised to photograph microscopic pictures of specimens containing magnetically-responsive substances.

When all of the mentioned prior art is considered it seems clear that the prior art to date has established the need for being able to view functionally magnetic specimens under a microscope while in the presence of a magnetic field and also to be able to preserve the specimens that were viewed under the microscope. Thus far, however, the prior art has not provided a practical method and apparatus for use as an attachment to a conventional microscope enabling magnetically-responsive substances to be viewed under the microscope while in the presence of a magnetic field and for thereafter being preserved with a conventional transparent slide and coverslip technique so that the same specimen can be preserved and viewed at any time in the future with the same results. The achieving of such a desired method and apparatus thus becomes the principal object of the present invention. Other objects will become apparent as the description proceeds.

DISCLOSURE OF THE INVENTION

According to the invention, there is provided method and apparatus enabling magnetically responsive substances to be contained while being viewed under a light microscope and in the presence of a magnetic field and to thereafter be preserved with a conventional transparent slide and cover glass technique.

More specifically, the invention apparatus incorporates a base member and a pivoted top member, both of which are formed of a non-magnetic material, e.g., aluminum. The base member mounts apparatus for producing an electromagnetic field proximate a well formed in the base member. The bottom of the well is transparent and the magnetically-responsive substance of interest is introduced into the well. The top member is then pivoted and clamped into position on the base member to bring an aperture in the top member in alignment with the well and an aperture beneath the well in the base member. A passage is provided by which substance can be added or withdrawn from the well using a pipette or similar instrument. The size of the base and top units conform to the space normally provided for inserting a slide into a stage holder of a conventional microscope such that the invention apparatus can be mounted and clamped on an ordinary light microscope stage in the position normally occupied by a slide. When the electromagnetic field source is energized, an electromagnetic field is established within the well which tends to cause the magnetically-responsive microspheres, particles, or other substances, in the well to be drawn towards the source of the magnetic field. This movement can be observed through the microscope while such movement is taking place. Upon completion of the desired observations, the separated-out, magnetically-responsive particles will be located on a coverslip which in turn can be incorporated with a conventional slide and stored for retrieval whenever desired for future observation.

The invention apparatus can be used on any conventional light microscope stage, provides a controllable magnetic field, enables the intensity of the field to be varied and controlled, enables the effects of a magnetic field to be observed at a microscopic level, incorporates a temperature monitor to avoid overheating of the specimen being observed and adapts to staining and other conventional histology techniques after the microscopic observation has been completed. For example, the specimen being observed can be separated, washed, and stained on a common coverslip while being observed under the microscope. Visual diagnosis may also be made in those instances where the specimen of interest is a medical specimen. Disposable optical surfaces and an easily cleaned apparatus are provided. The invention method and apparatus are deemed useful in a wide range of bio-technical, medical, geological, metallurgical and general educational applications. An alternative apparatus using a permanent magnet source is also disclosed.

BEST MODE FOR CARRYING OUT THE INVENTION

Figure 1:
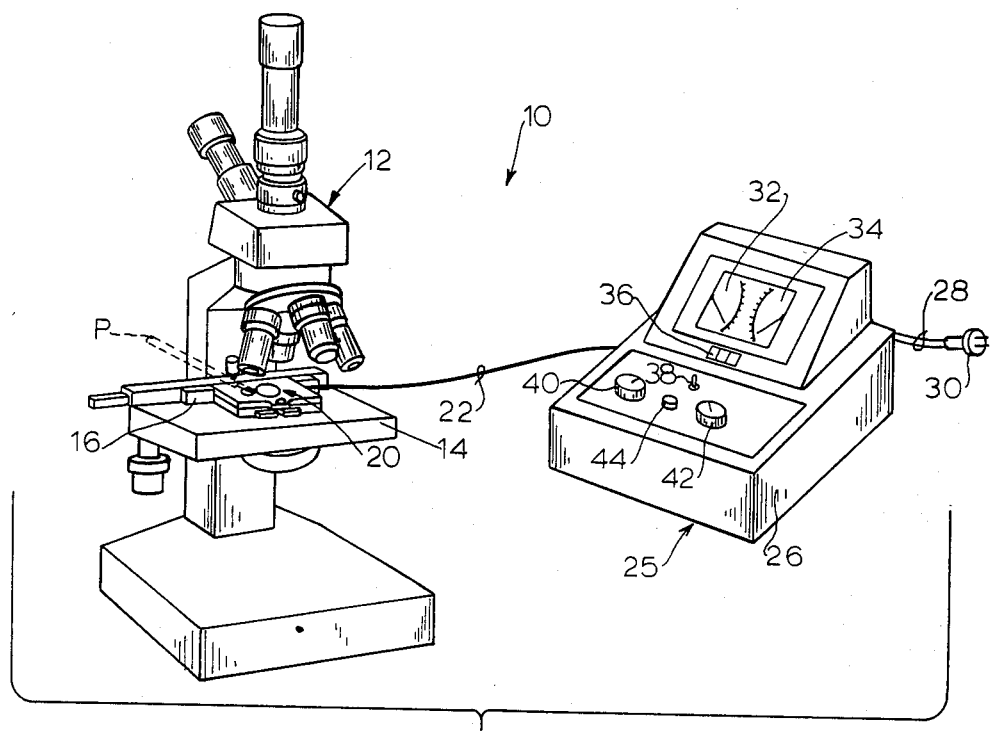
FIG. 1 is a schematic view of a system for examining magnetically-responsive substances according to the method and apparatus of the invention.
Figure 2:
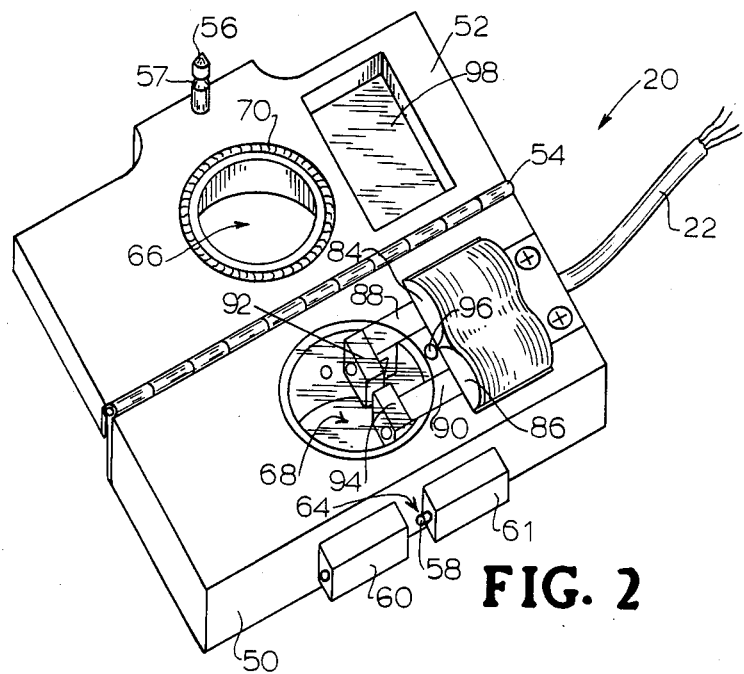
FIG. 2 is a perspective view of the assembled hinged top and base units in an open position.
Figure 3:
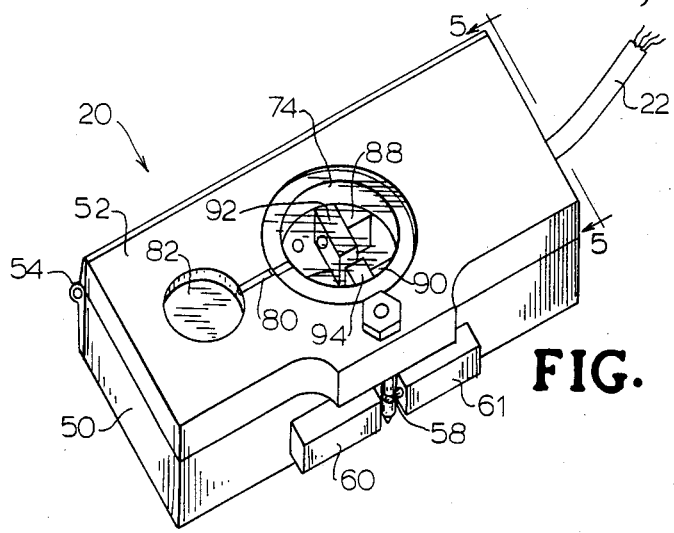
FIG. 3 is a perspective view of the assembled hinged top and base units in a closed position.
Figure 4:
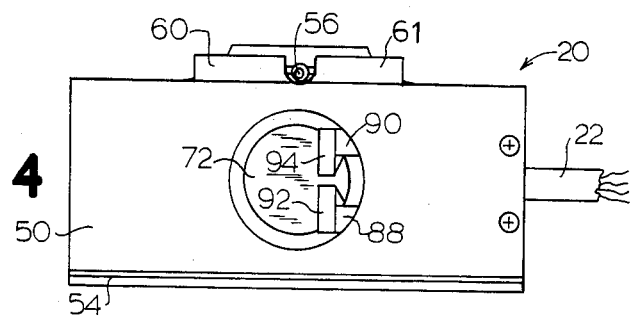
FIG. 4 is a bottom view of the assembled top and base units.
Figure 5:
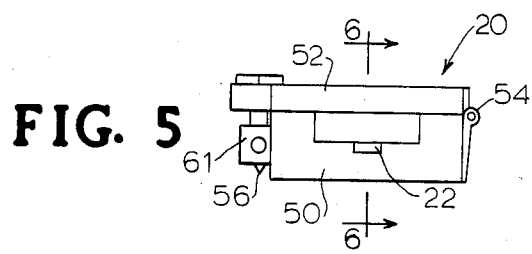
FIG. 5 is an end view taken in the direction of line 5—5 of FIG. 3.

A cell-examining system 10 as an example of the invention incorporates a conventional light microscope 12 having a stage 14 with adjustable side grips 16 for receiving the later-described magnetic cell holder 20 of the invention. Cell holder 20 is powered and controlled through cable 22 which also feeds back temperature signal information as later described. Cable 22 connects to a control 25 powered through cable 28 connected through plug 30 to a conventional 110 volt, 60 cycle AC supply. Control 25 incorporates in a housing 26 an ammeter 32, a voltage meter 34, a digital temperature readout 36, an on-off switch 38, a current control 40, a voltage control 42 and an on-off indicator light 44. Control 25 contains appropriate and conventional circuitry for the functions described and, since such circuitry is well known and may take many specific forms, is not described in further detail.

Figure 6:
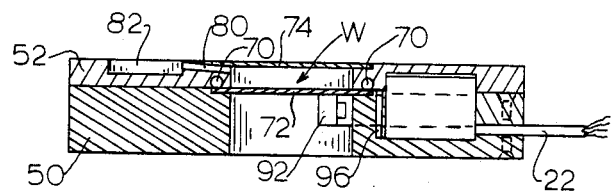
FIG. 6 is a section view taken along line 6—6 of FIG. 5.

FIGS. 2-6 illustrate cell holder 20 in a first embodiment in which there is incorporated a base member 50 hinged to a cover member 52 by hinge 54. A detent pin 56 has a groove 57 releasably latched by a pair of spring-loaded, opposed, detent latch pins 58 mounted in blocks 60, 61 secured on the front of base member 50 and having a space 64 for receiving pin 56 when latched. Base member 50 and cover member 52 have circular viewing apertures 66, 68 which align when cell holder 20 is closed as in FIG. 3. An O-ring 70 surrounds aperture 66. A shallow recess surrounds the top of aperture 68 to loosely receive a standard lower circular thin coverslip 72 and a similar recess surrounds the top of aperture 66 to receive a similar upper coverslip slip 74 in opposing positions. With the cell holder 20 closed as in FIGS. 3 and 6, a well W is formed between cover slips 72 and 74 with coverslip 72 forming the bottom of the well and coverslip 74 forming the top of the well as best seen in FIG. 6.

A narrow downwardly sloping channel 80 extends from a circular depression 82 to well W which facilitates insertion of a pipette P in channel 80 to add and remove substances in well W as seen in FIG. 1. Electromagnets 84, 86 are DC-powered from a rectifier source in control 25 and includes pole arms 88, 90 and removable pole faces 92, 94. Thus, various size and shaped pole faces may be installed to vary the strength and orientation of the magnetic field as required for specific applications.

From the foregoing description, it will be understood that a DC-powered magnetic field is established immediately below coverslip 72 thus making such magnetic field available for attracting and sorting out magnetic cell particles under observation in well W. A conventional thermocouple 96 is installed in base member 50 between well W and electromagnets 84, 86 for the purpose of sensing temperature and developing appropriate temperature signals which can be displayed by the digital temperature display 36 on control 25 through appropriate circuitry well known in the art. Such temperature sensing circuitry is calibrated prior to use such that the temperature display 36 exhibits a temperature representative of the temperature at which the magnetic cell particles are at during the time of observation. Appropriate use of the current control 40 and voltage control 42 enables the temperature to be adjusted as well as the strength of the magnetic field. A depression 98 in cover 52 receives the upper portions of the electromagnets 84, 86 when the cell holder 20 is closed as in FIG. 3.

Figure 7:
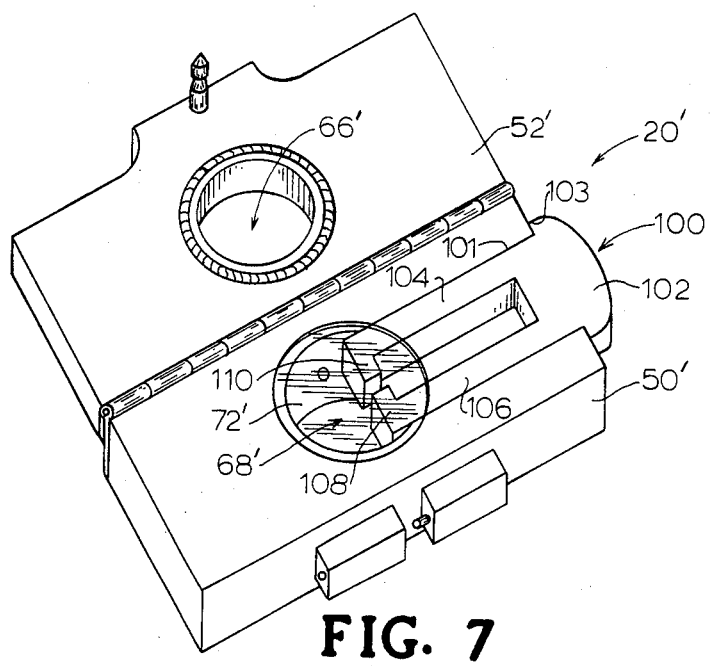
FIG. 7 illustrates an alternative embodiment utilizing a movable permanent magnet.

Prior to explaining the use of the invention, reference is made to FIG. 7 in which a simplified version of the cell holder is illustrated in a form suited for example to use in high schools, and the like, to illustrate the general principles of application. In FIG. 7, the cell holder 20' incorporates a modified cover member 52' and a modified base 50' designed to slidably receive in a slot 101 formed in base 50' a permanent magnet 100 having a handle portion 102 with stop portions 103, arm portions 104, 106, and pole face portions 108, 110. From prior description, it will be understood that a well is established in the manner previously described and the magnetic field is established and removed simply by moving the permanent magnet 100 in and out of its slot 101. As in the first embodiment, the aperture 66' in cover member 52' mates with a similar aperture 68' in base member 50'. As with the first embodiment, a lower coverslip 72' is received by the base member 50' and an upper coverslip 74' is received by the cover member 52' for establishing a well W' therebetween in the manner previously explained. Also, as in the first embodiment, a narrow channel 80' and depression 82' facilitate use of the pipette P.

In use, the cell holder 20 is mounted on the stage 14 of the microscope 12 as best illustrated in FIG. 1 with the microscope and cell holder viewing paths aligned. A suitable quantity of the selected magnetic cells or other magnetically-response substance is admitted to the well W. Utilizing the on/off switch 38 and the current control 40 and voltage control 42, an appropriate magnetic field is established and the normally-slow drift of the magnetic particles observed in a cell-sorting-type operation. Temperature is controlled as previously described as well as the strength of the magnetic field. At the end of the experiment, control 25 is turned off, cover member 52 is opened, and a typical glass slide is applied to the substances on the lower coverslip. Since such substances are typically sticky, the lower coverslip 72 is made to adhere to the glass slide which can then be converted and suitably coated as a permanent exhibit for the results of the experiment, whatever it might have been. In the event it is necessary to wash the substances being observed or to add or remove liquid substances, such operations can be readily handled through use of the pipette P in the slot 80 as previously explained.

Figure 8:
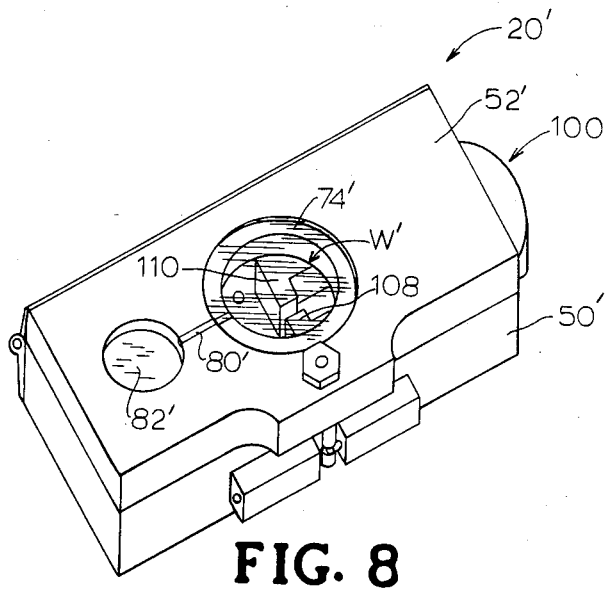
FIG. 8 illustrates the FIG. 7 apparatus in a closed position.

The operation utilizing the alternative cell holder 20' of FIGS. 7 and 8 generally follow the same procedure as explained for the cell holder 20. Therefore, further explanation is not deemed necessary. It will, of course, be understood that with the cell holder 20' that the presence and strength of the magnetic field is controlled solely by moving the permanent magnet 100 in and out of the base member 50'.

What is claimed is:

1. A microscope assembly, comprising:
   (a) a light microscope having a stage, a viewing path through said stage and securing means for securing to said stage subjects being examined in said viewing path;
   (b) a structure of non-magnetic material secured to said stage by said securing means and having a vertical opening extending therethrough and coinciding with said microscope viewing path, said structure forming a shallow well within said opening for holding a fluid with magnetically responsive particles, said well having an optically clear bottom wall establishing and aperture coinciding with said microscope viewing path; and
   (c) a magnetic field source mounted in said structure and having a pair of closely spaced opposed poles located below and immediately adjacent said bottom wall aperture and laterally offset from the axis of said viewing path, said field source being operative to pull said particles over said bottom wall to assume a position near said poles.

2. An assembly as claimed in claim 1 including means to control the presence and strength of the field produced by said source.

3. An assembly as claimed in claim 1 wherein said magnetic field source comprises a permanent magnet.

4. An assembly as claimed in claim 1 wherein said structure comprises separable top and bottom structure and including a pair of transparent coverslips adapted to form said well between said coverslips with one of said coverslips being retained in said top structure and the other being retained in said bottom structure.

5. An assembly as claimed in claim 4 wherein said top and bottom structure are hinge connected at one selected location thereon and releasably secured at another selected location thereon.

6. An assembly as claimed in claim 4 wherein said top structure is formed with a passage providing pipette access to said well.

7. An assembly as claimed in claim 1 wherein said magnetic field source comprises an electromagnetic DC field source with means for controlling the presence and strength of the field produced by said source comprising control means electrically coupled to said source.

8. An assembly as claimed in claim 7 including means for measuring and displaying the temperature of said well.

* * * * *